United States Patent [19]
Bond

[11] 3,870,392
[45] Mar. 11, 1975

[54] GROUNDING MOUNTING MEANS
[75] Inventor: Ralph W. Bond, Evansville, Ind.
[73] Assignee: Whirlpool Corporation, Benton Harbor, Mich.
[22] Filed: Nov. 14, 1973
[21] Appl. No.: 415,550

[52] U.S. Cl............. 339/14 R, 174/51, 180/68.5, 339/96, 339/147
[51] Int. Cl............................................. H01r 3/06
[58] Field of Search..... 339/14 R, 14 L, 14 T, 95 R, 339/96, 143 R, 147; 180/68.5; 62/262; 174/51

[56] References Cited
UNITED STATES PATENTS
| | | | |
|---|---|---|---|
| 3,053,336 | 9/1962 | Zednik, Jr. | 180/68.5 |
| 3,627,900 | 12/1971 | Robinson | 339/95 R |
| 3,787,797 | 1/1974 | Kurz | 339/95 R |
| 3,810,252 | 5/1974 | Leister et al. | 174/51 X |

Primary Examiner—Roy Lake
Assistant Examiner—DeWalden W. Jones
Attorney, Agent, or Firm—Hofgren, Wegner, Allen, Stellman & McCord

[57] ABSTRACT

A means for mounting an electrical device, such as a capacitor, to a metal wall in grounded association with the wall notwithstanding the provision of a protective insulating coating on the capacitor and metal wall. The mounting means includes a clip having barbs, or teeth, engaging a lip portion of the capacitor and additional barbs, or teeth, engaging the metal portion of the wall to provide an electrical conductive association therebetween.

14 Claims, 2 Drawing Figures

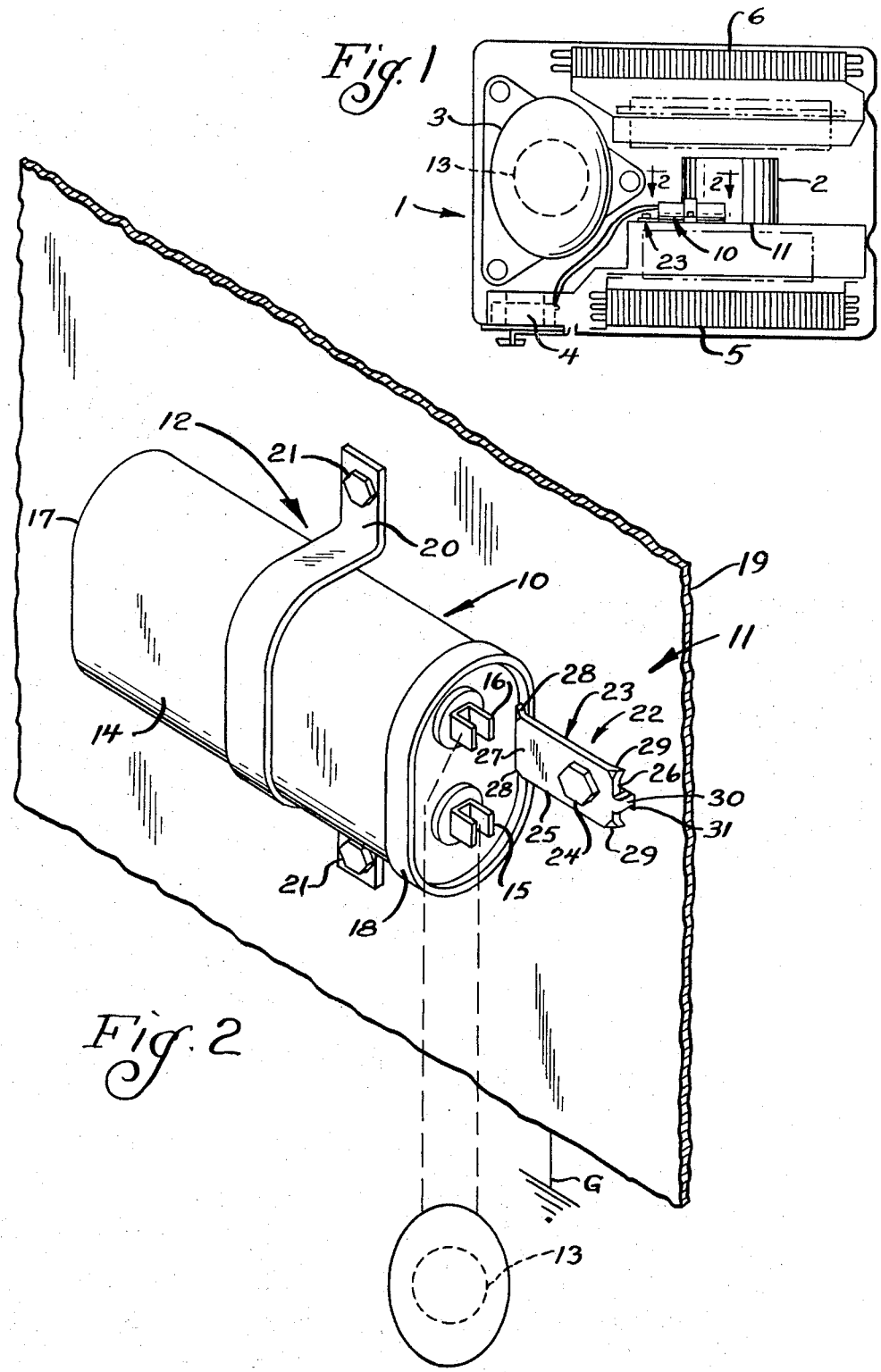

GROUNDING MOUNTING MEANS

BACKGROUND OF THE INVENTION

1. Field of the Invention

This invention relates to mounting means, and in particular, for mounting an electrical element, such as a capacitor, in grounded association with a support wall.

2. Description of the Prior Art

A number of devices have been developed for providing clamped electrical association of electrical elements. One such device comprises the electrical clamp-and-connector disclosure in the I. S. Blonder U.S. Pat. No. 3,015,510. In that patent, a connector is disclosed which is adapted to hold and establish electrical contact with insulation covered transmission line conductors and the like. The connector disclosed therein comprises frustoconical sheet material clamping members having serrated edges twisted slightly out of the surface of the cone.

In U.S. Pat. No. 2,911,608 of T. H. Lee, a ground spring clamp is shown for connecting a radio speaker basket to a fixed support. The spring clip includes clipping means operative upon a predetermined relative rotation between the clip and basket and means on the clip for engaging the support to connect the basket and support.

In U.S. Pat. No. 3,253,247 of Jacques Vos, an electrical connector is disclosed for connecting conductive shielding of electrical cables, utilizing a screw to provide the piercing force for serrations on opposite sides of the screw.

SUMMARY OF THE INVENTION

The present invention comprehends an air conditioner having improved structure for mounting a capacitor in grounded association with a metal wall provided with an insulating covering, the capacitor having a metal housing provided with a projecting metal portion having an insulating covering, the structure comprising means embracing the capacitor housing for retaining the capacitor to the wall, a metal grounding clip having a first tooth portion engaging the capacitor projecting portion and a second tooth portion engaging the wall, and means for urging the first tooth portion of the clip through the insulating covering of the capacitor housing projecting portion into electrical conductive association with the metal projecting portion and urging the second tooth portion of the clip through the wall insulating covering into electrical conductive association with the metal wall.

The grounding clip may define an elongated metal element with the first and second tooth portions being disposed at oppsite ends thereof.

The mounting wall may define a locating slot and the clip may be provided with a tab received in the slot for locating the clip in a preselected position relative to the capacitor housing projecting portion.

The urging means may comprise metal means, such as a screw engaging the metal of both the clip and the wall.

In the illustrated embodiment, the tooth portions of the clip comprise a plurality of sharp teeth.

The insulating coating on the capacitor and mounting wall illustratively comprises paint coatings.

More specifically, the invention comprehends the provision in an appliance, such as an air conditioner, having an electrical motor and a painted metal wall, motor control structure comprising a painted capacitor including a lip portion, means mounting the clip to the wall, and a grounding clamp means for electrically grounding the capacitor to the wall, the clamp means including a rectangular spring steel member having truned corners forming barbs for piercing paint, the member positioned with a first set of the barbs contacting the lip portion and a second set of the barbs contacting the wall, and a screw means for insertion through the member into the wall to provide a piercing force for the barbs, the first set of barbs piercing the paint on the lip portion and the second set of barbs piercing the paint on the metal wall.

Thus, the present invention comprehends an improved mounting structure which is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a top view of an air conditioner with the outer wrapper removed;

FIG. 2 is a fragmentary perspective view along lines 2—2 of FIG. 1 illustrating the mounting of a capacitor to a mounting wall by a mounting structure embodying the invention and with the relationship of the capacitor to the electric motor of the appliance illustrated in dotted lines.

DESCRIPTION OF THE PREFERRED EMBODIMENT

In the exemplary embodiment of the invention as disclosed in the drawings, an air conditioner generally designated 1 is shown. The air conditioner is provided with an air flow system including a fan motor 2, an evaporator 5 and a condenser 6, a hermetically sealed compressor 3 including a motor 13, and a control 4. Referring to FIG. 2, an electrical device generally designated 10 is shown mounted to a mounting wall 11 by means of a mounting structure generally designated 12. In the illustreated embodiment, the electrical element comprises a capacitor, such as used in connection with the control of an electric motor 13 in an appliance such as an air conditioner. Such capacitors are conventionally utilized for providing starting of the compressor motor 13 and/or fan motor 2 in such an appliance, and conventionally include an oil-filled housing 14 provided at one end with suitable terminals 15 and 16 for electrical connection as to the motor 13.

Housing 14 conventionally comprises a metal housing having a painted outer surface 17 and defines a projecting portion 18 at one end. Projecting portion 18 conventionally comprises a projecting flange-type lip and conventionally is similarly painted as housing 14.

It is desirable in such installations to ground the capacitor to the metal wall 11. A problem arises, however, in that the metal wall is conventionally also provided with an insulative paint covering 19, thus making it necessary to provide a special grounding arrangement between the metal of the capacitor housing and the metal of the wall.

As shown in the drawing, the capacitor may be mechanically secured to the wall by a suitable strap 20 which embraces the housing 14 and is secured to the metal wall by suitable fasteners such as screws 21.

However, because of the insulative characteristics of the paint coatings 17 and 19, the mounting strap 20 does not provide an effective grounding of the capacitor.

The present invention comprehends providing an improved grounding structure generally designated 22 for effecting the desired grounding of the capacitor housing to the metal wall. As shown in the drawing, grounding structure 22 includes a metal clip 23 and securing means 24 illustratively comprising a screw for securing the strip to the metal wall. The clip illustratively comprises a spring steel strip having a slight arcuate configuration so as to be bowed out somewhat in its midportion 25 from its opposite ends 26 and 27. End 27 defines a tooth portion of the clip comprising a pair of inturned teeth, or barbs, 28 at the opposite corners of end portion 27. The opposite end 26 of the slip similarly defines a second tooth portion of the clip comprising a pair of inturned teeth, or barbs, 29 at the opposite corners thereof.

At the outer end 26, the clip further defines an inturned locating tab 30 received in a locating slot 31 provided in metal wall 11.

Thus, in grounding the capacitor 10 to the wall 11, the clip teeth 28 are urged by the screw 24 through the insulative paint covering of the lip 18 into electrical conductive association with the lip portion of the capacitor housing. The arcuate configuration of the spring steel clip positively assures penetration of the paint covering to provide a positive electrical connection.

Concurrently, the teeth 29 are urged through the paint covering 19 of the metal wall 11 into electrical conductive association with the metal wall, thereby providing a positive electrical grounded connection between the capacitor housing and the metal wall which, as illustrated in the drawing, may be connected suitably to ground G in the appliance.

The capacitor is effectively secured to the wall by the mounting strap 20 and screws 21. However, the grounded connection of the lip portion 18 to the metal wall at a point spaced from the strap 20 provides an improved positive retention of the capacitor to the wall. This retention is enhanced by the springy characteristics of the clip 23, providing a vibration resistant grounded connection.

As the teeth 28 engage the lip portion 18 of the capacitor, penetration of the housing to expose the capacitor element therein is effectively avoided while yet a positive electrical ground connection is obtained.

Installation of the clip is facilitated by the use of the locating tab 30 and slot 31 which properly position the sharp teeth 28 in desired relationship with the projecting lip 18, thereby further assuring prevention of undesirable penetration of the housing 14 by the grounding teeth.

As shown, the grounding clip comprises an elongated rectangular strip which may be readily formed by simple shearing and turning steps to provide the piercing teeth and locating tab. Thus, the grounding means is extremely simple and economical of construction while yet providing an improved grounding of the electrical capacitor element.

The screw 24 is passed through the grounding clip at a position spaced outwardly from the inner end 27 sufficiently to locate the screw outwardly of the terminals 15 for facilitated connection.

The grounding means of the present invention functions to provide an improved positive grounding of the capacitor also where the capacitor or wall are unpainted as the sharp teeth provide improved electrical contact by penetrating into the clean virgin metal subjacent the exposed surface of the flange lip 18 and metal wall 11, thereby providing improved safety in the effectively positive grounding of the capacitor.

The foregoing disclosure of specific embodiments is illustrative of the broad inventive concepts comprehended by the invention.

Having described the invention, the embodiments of the invention in which an exclusive property or privilege is claimed are defined as follows:

1. In an appliance such as an air conditioner, structure for mounting a capacitor in grounded association with a metal wall provided with an insulating covering, the capacitor having a metal housing provided with a projecting metal portion having an insulating covering, said structure comprising:
   means embracing the capacitor housing for retaining the capacitor to said wall;
   a metal grounding clip having a first tooth portion engaging said capacitor housing projecting portion and a second tooth portion engaging said wall; and
   means for urging said first tooth portion of the clip through said insulating covering of said capacitor housing projecting portion into electrical conductive association with said capacitor metal housing projecting portion and urging said second tooth portion of the clip through said wall insulating covering into electrically conductive association with said metal wall.

2. The appliance of claim 1 wherein said clip comprises an elongated metal element with said first and second tooth portions being disposed at opposite ends thereof.

3. The appliance of claim 1 wherein said housing projecting portion comprises a flange at one end of the housing and said clip further retains said flange against the wall.

4. The appliance of claim 1 wherein said wall further defines a locating slot and said clip is provided with a tab received in said slot for locating the clip in a preselected position relative to said capacitor housing projecting portion.

5. The appliance of claim 1 wherein said urging means comprises metal means engaging said clip and said metal wall.

6. The appliance of claim 1 wherein said first tooth means comprises a plurality of sharp teeth penetrating said housing portion insulating covering to engage said metal housing projecting portion at a plurality of spaced positions.

7. The appliance of claim 1 wherein said second tooth means comprises a plurality of sharp teeth penetrating said wall insulating covering to engage said metal wall at a plurality of spaced positions.

8. The appliance of claim 1 wherein said clip and wall define cooperating means for positioning said clip for facilitated urging of said first tooth portion into electrical conductive association with said capacitor housing projecting portion.

9. The appliance of claim 1 wherein said capacitor insulating covering comprises a paint coating.

10. The appliance of claim 1 wherein said wall insulating covering comprises a paint coating.

11. In an appliance such as an air conditioner having an electrical motor and a painted metal wall, motor control structure comprising:
- a painted capacitor including a lip portion;
- means mounting said capacitor to said wall; and
- a grounding clamp means for electrically grounding said capacitor to said wall, said clamp means including a rectangular spring steel member having turned corners forming barbs for piercing paint, said member positioned with a first set of said barbs contacting said lip portion and a second set of said barbs contacting said wall, and a screw means for insertion through said member into said wall to provide a piercing force for said barbs, said first set of barbs piercing the paint on said lip portion and said second set of barbs piercing the paint on said metal wall.

12. The appliance of claim 11 wherein said capacitor includes an end portion having a plurality of electrical terminals and said lip portion comprises a flange projecting from the periphery of said end portions about said terminals, said grounding clamp means including securing means for securing said steel member to said wall comprising a screw spaced outwardly from said first set of barbs to be disposed outwardly of said electrical terminals.

13. The appliance of claim 11 wherein said spring steel member comprises a curved strip, and said grounding clamp means includes means for urging the mid-portion of the strip toward said wall for resultingly urging said barbs through the paint of said wall and lip portion.

14. The appliance of claim 11 wherein said wall defines a locating slot and said spring steel member defines an outer end carrying said second set of barbs and further provided with a turned tab projecting into said locating slot.

* * * * *